(12) United States Patent
Kawamura et al.

(10) Patent No.: US 10,375,205 B2
(45) Date of Patent: Aug. 6, 2019

(54) DATA DELIVERY SYSTEM, CONTROL SERVER, AND DATA DELIVERY METHOD

(71) Applicant: CLARION CO., LTD., Saitama (JP)

(72) Inventors: Shinji Kawamura, Saitama (JP); Yoshitaka Sumitomo, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 173 days.

(21) Appl. No.: 15/118,027

(22) PCT Filed: Apr. 10, 2015

(86) PCT No.: PCT/JP2015/061216
§ 371 (c)(1),
(2) Date: Aug. 10, 2016

(87) PCT Pub. No.: WO2015/159815
PCT Pub. Date: Oct. 22, 2015

(65) Prior Publication Data
US 2017/0026492 A1    Jan. 26, 2017

(30) Foreign Application Priority Data

Apr. 16, 2014  (JP) .................................. 2014-084218

(51) Int. Cl.
*H04L 29/08* (2006.01)
*B60R 16/02* (2006.01)
(Continued)

(52) U.S. Cl.
CPC .............. *H04L 67/34* (2013.01); *B60R 16/02* (2013.01); *G06F 8/60* (2013.01); *G08G 1/00* (2013.01);
(Continued)

(58) Field of Classification Search
CPC .............. G06F 15/16; G06F 17/30575; G06F 17/30241; H04L 63/308; H04L 65/60
(Continued)

(56) References Cited

U.S. PATENT DOCUMENTS

2001/0021946 A1 *  9/2001  Ogami ................... G06F 16/27
                                                            709/217
2002/0145924 A1 * 10/2002  Beckwith ............... G06F 9/465
                                                            365/200
(Continued)

FOREIGN PATENT DOCUMENTS

EP           1699031 A1    9/2006
JP        2003-256303 A    9/2003
(Continued)

OTHER PUBLICATIONS

International Preliminary Report on Patentability issued for corresponding PCT/JP2015/061216.
(Continued)

*Primary Examiner* — Tesfay Yohannes
(74) *Attorney, Agent, or Firm* — IP Business Solutions, LLC

(57) ABSTRACT

A data delivery system capable of reducing processing load of a server is provided. A control server includes a selecting unit selecting a TCU to which update data is to be delivered based on priority levels set in association with TCUs which are delivery targets, a message generating unit generating and transmitting a message inquiring as to whether or not the TCU is ready to accept update data to the TCU selected by the selecting unit, and a delivery control unit receiving a response message transmitted from the TCU in response to the transmitted message, selecting a TCU to which update (Continued)

data is to be delivered based on the received response message and requesting a delivery server to deliver update data to the selected TCU.

13 Claims, 13 Drawing Sheets

(51) Int. Cl.
*G06F 8/60* (2018.01)
*G08G 1/00* (2006.01)
*H04W 4/20* (2018.01)

(52) U.S. Cl.
CPC ............ *H04L 67/322* (2013.01); *H04W 4/20* (2013.01); *Y02D 10/42* (2018.01)

(58) Field of Classification Search
USPC .................... 709/217, 219, 231; 370/331
See application file for complete search history.

(56) References Cited

U.S. PATENT DOCUMENTS

| | | | |
|---|---|---|---|
| 2003/0135613 A1 | 7/2003 | Yoshida et al. | |
| 2005/0256614 A1 | 11/2005 | Habermas | |
| 2007/0043831 A1 | 2/2007 | Kessler et al. | |
| 2007/0091921 A1 | 4/2007 | Elliot et al. | |
| 2007/0100513 A1 | 5/2007 | Asano | |
| 2009/0168742 A1 | 7/2009 | Sumcad et al. | |
| 2009/0259734 A1 | 10/2009 | Morikawa | |
| 2010/0145774 A1* | 6/2010 | Veshnyakov | G07C 13/00 705/12 |
| 2010/0322187 A1* | 12/2010 | Tani | H04L 1/0007 370/331 |
| 2011/0004885 A1* | 1/2011 | Kikuchi | H04L 41/147 718/104 |
| 2011/0213842 A1* | 9/2011 | Takenouchi | G06Q 30/02 709/206 |
| 2011/0244916 A1* | 10/2011 | Attanasio | H04M 3/2281 455/525 |
| 2013/0073473 A1* | 3/2013 | Heath | G06Q 30/02 705/319 |
| 2013/0114422 A1 | 5/2013 | Clark | |
| 2013/0138776 A1 | 5/2013 | Yamashita et al. | |
| 2013/0150029 A1* | 6/2013 | Jeong | H04W 8/06 455/432.3 |
| 2013/0282915 A1* | 10/2013 | Patel | H04L 65/60 709/231 |
| 2015/0081357 A1* | 3/2015 | Akita | G06Q 10/06 705/7.12 |
| 2015/0169093 A1* | 6/2015 | Nakao | G06F 3/041 345/173 |

FOREIGN PATENT DOCUMENTS

| | | |
|---|---|---|
| JP | 2004-249914 A | 9/2004 |
| JP | 2007-316686 A | 12/2007 |
| JP | 2009-513046 A | 3/2009 |
| JP | 2009-271904 A | 11/2009 |
| JP | 2011-180724 A | 9/2011 |
| JP | 2013-114499 A | 6/2013 |
| WO | 2005/059862 A1 | 6/2005 |

OTHER PUBLICATIONS

Written Opinion of the International Search Authority issued for corresponding PCT/JP2015/061216.
International Search Report issued for corresponding PCT/JP2015/061216 application.
Written Opinion of the International Search Authority issued for corresponding PCT/JP2015/061216 application.
Notice of Reasons for Refusal mailed by Japan Patent Office dated May 16, 2017 in the corresponding Japanese patent application No. 2016-513757.
Extended European Search Report mailed by European Patent Office dated Nov. 14, 2017 in the corresponding European patent application No. 15780142.4-1954.
Notice of Reasons for Refusal mailed by Chinese Patent Office dated Jul. 20, 2018in corresponding Chinese patent Application No. 201580019534.1.
Chinese Office Action mailed by Chinese Patent Office dated Jan. 4, 2019 in corresponding Chinese patent application No. 201580019534.1.
Chinese Office Action mailed by Chinese Patent Office dated Apr. 3, 2019 in corresponding Chinese patent application No. 201580019534.1.

* cited by examiner

FIG.4

TCU MANAGEMENT TABLE

| TCU IDENTIFICATION NUMBER | HARDWARE INFORMATION | | SOFTWARE INFORMATION | TCU STATE | WHETHER OR NOT SMS CAN BE TRANSMITTED | PHONE NUMBER |
|---|---|---|---|---|---|---|
| | MODEL NAME | DELIVERY DESTINATION | | | | |
| 21034-312 | MML-101 | JAPAN | ABC 3.0 | ACTIVE STATE, UPDATE IS ALLOWED | TRANSMISSION IS POSSIBLE | 090-111-222 |
| 21034-313 | MML-105 | JAPAN | ABD 2.5 | ACTIVE STATE, UPDATE IS ALLOWED | TRANSMISSION IS POSSIBLE | 090-333-444 |
| 21034-314 | NNS-320 | UNITED STATES | BBR 5.0 | ACTIVE STATE, UPDATE IS ALLOWED | TRANSMISSION IS POSSIBLE | 090-555-666 |
| 21034-315 | SST-103 | EU | FGH 1.0 | STANDBY STATE, UPDATE IS REJECTED | TRANSMISSION IS IMPOSSIBLE | 090-777-888 |
| ... | ... | ... | ... | | | |

FIG. 5

UPDATE MANAGEMENT TABLE

| PRIORITY LEVEL | TCU IDENTIFICATION NUMBER | WHETHER OR NOT SMS CAN BE TRANSMITTED | SMS TRANSMISSION STATE | TCU STATE | VERSION INFORMATION |
|---|---|---|---|---|---|
| 1 | 21034-312 | TRANSMISSION IS POSSIBLE | TRANSMITTED | ACTIVE STATE, UPDATE IS ALLOWED | 3.1 |
| 2 | 21034-313 | TRANSMISSION IS POSSIBLE | BEING TRANSMITTED | ACTIVE STATE, UPDATE IS ALLOWED | 3.1 |
| 3 | 21034-314 | TRANSMISSION IS POSSIBLE | BEING TRANSMITTED | ACTIVE STATE, UPDATE IS ALLOWED | 3.2 |
| 4 | 21034-315 | TRANSMISSION IS IMPOSSIBLE | — | STANDBY STATE, UPDATE IS REJECTED | 3.2 |
| ××× | ××× | ××× | ××× | ××× | ××× |

FIG.6

PROCESSING LOAD MANAGEMENT TABLE

| PROCESSING LOAD | DELIVERY STATE | SMS TRANSMISSION STATE | TCU IDENTIFICATION NUMBER |
|---|---|---|---|
| 20% | BEING DELIVERED | TRANSMITTED | 21034-312 |
| 30% | BEING DELIVERED | TRANSMITTED | 21034-313 |
| 0% | NOT DELIVERED | SUSPENDED | 21034-314 |
| TOTAL 50% | ... | ... | ... |

DATA DELIVERY SYSTEM, CONTROL SERVER, AND DATA DELIVERY METHOD

CROSS-REFERENCE TO RELATED APPLICATION

This is the U.S. National Phase under 35 U.S.C. 371 of International Application No. PCT/JP2015/061216, filed on Apr. 10, 2015, which in turn claims the benefit of Japanese Patent Application No. 2014-084218, filed on Apr. 16, 2014, the disclosures of which are incorporated by reference herein.

BACKGROUND OF THE INVENTION

Field of the Invention

The present invention relates to a data delivery system, a control server and a data delivery method.

Description of the Related Art

As background art in the technical field of the present invention, there is Japanese Patent Laid-Open No. 2004-249914. This literature discloses an on-vehicle device including radio communication control means 105 for receiving an update file of a program by radio communication with a center server 200, a RAM 104 for storing the received update file, engine state detection means 107 for detecting the state of an engine, and program update means 106 for updating the program based on the update file stored in a RAM 104 when stopping of the engine of a vehicle is detected by the engine state detection means 107.

SUMMARY OF THE INVENTION

However, Japanese Patent Laid-Open No. 2004-249914 does not disclose a method for reducing processing load of a center server 200.

The present invention has been made in view of the above-described circumstances, and an object of the present invention is to provide a data delivery system, a control server and a data delivery method which can reduce processing load of a server.

To achieve the object, a data delivery system of the present invention is a data delivery system including a plurality of communication apparatuses, and a control server selecting a communication apparatus to which update data is to be delivered from among the plurality of communication apparatuses, the control server including a selecting unit selecting the communication apparatus to which the update data is to be delivered based on priority levels set in association with communication apparatuses which are delivery targets, a transmitting unit transmitting a message inquiring whether or not the communication apparatus is ready to accept the update data, to the communication apparatus selected by the selecting unit, a receiving unit receiving a response message transmitted by the communication apparatus in response to the message transmitted by the transmitting unit, and a delivery requesting unit selecting the communication apparatus to which the update data is to be delivered based on the response message received by the receiving unit and requesting a delivery server which stores the update data to deliver the update data to the selected communication apparatus.

According to the present invention, it is possible to reduce processing load of a server.

BRIEF DESCRIPTION OF THE DRAWINGS

FIG. 4 is a diagram illustrating an example of an update management table.
FIG. 5 is a diagram illustrating an example of a processing load management table.
FIG. 6 is a diagram illustrating an example of a configuration of functional blocks of the control server.

DETAILED DESCRIPTION OF THE INVENTION

Embodiments of the present invention will be described below with reference to the accompanying drawings.

Figure 1:
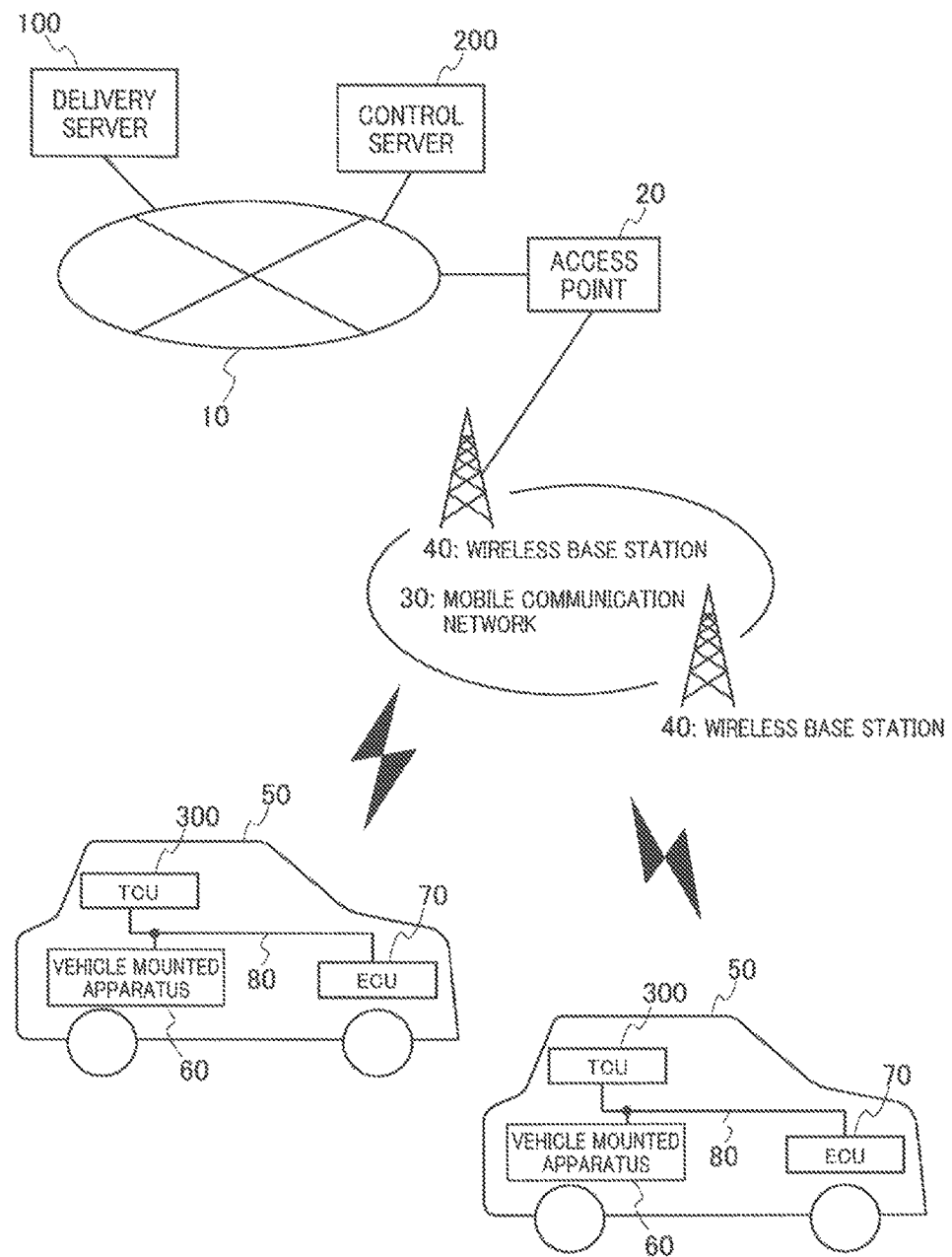
FIG. 1 is a diagram illustrating an example of a system configuration of the present embodiment.

First, a system configuration of the present embodiment will be described with reference to FIG. 1. FIG. 1 is a configuration diagram schematically illustrating the system configuration of the present embodiment. The present embodiment includes a delivery server 100, a control server 200, and a TCU (Telematics control unit) 300 mounted on each vehicle 50. The delivery server 100 and the control server 200 are connected to a network 10, and the TCU 300 is configured to be able to connect to a mobile communication network 30. The network 10 is a communication line network which allows bidirectional communication. As this network 10, for example, a public line network such as the Internet, a telephone network, a satellite communication network and a broadcast communication path, a dedicated line network such as a WAN (Wide Area Network), a LAN (Local Area Network), an IP-VPN (Internet Protocol-Virtual Private Network), Ethernet (registered trademark) and a wireless LAN, or the like, can be used, and this network 10 may be either wired or wireless. Further, a communication network of the mobile communication network 30 is configured with a plurality of network apparatuses such as a wireless base station 40, a base station control apparatus and switching equipment. Further, the network 10 and the mobile communication network 30 are connected via an access point 20. The access point 20 relays communication via the network 10 performed by the control server 200 or the delivery server 100 to the mobile communication network 30. Examples of such an access point 20 can include a server of a carrier which provides the mobile communication network 30, or the like.

The delivery server 100 stores software to be delivered to the TCU 300 and update data of this software (hereinafter, collectively referred to as update data). The delivery server 100 delivers the update data to the TCU 300 designated by the control server 200.

The control server 200 selects a TCU 300 to which the update data is to be delivered according to conditions such as a priority level which will be described later, and instructs the delivery server 100 to deliver the update data to the selected TCU 300.

In the present embodiment, while update data of software will be described as an example of data to be delivered to the TCU 300 by the delivery server 100, data to be delivered to the TCU 300 by the delivery server 100 is not limited to the update data. For example, content data utilized by the vehicle mounted apparatus 60 mounted on the vehicle 50 can be delivered from the delivery server 100 to the TCU 300. The content data can include map data (such as road shape data, road width data, road regulation data, topography data, mark data, intersection data and facility data), audio data, music data, video data, application data such as a game, or the like.

Further, the update data to be delivered to the TCU 300 by the delivery server 100 may be data for updating software installed in the TCU 300 or data for updating software installed in the vehicle mounted apparatus 60 or an ECU 70.

Still further, the communication apparatus may employ any configuration without departing from features of the present invention, if the communication apparatus is an apparatus which is connected to the control server 200 or the delivery server 100 via the network 10 or the mobile communication network 30 and which can perform data communication with the control server 200 or the delivery server 100. For example, when delivery of the update data or the content data to be utilized at the vehicle mounted apparatus 60 is received from the delivery server 100, the vehicle mounted apparatus 60 itself may be connected to the mobile communication network 30 so as to transmit/receive data to/from the delivery server 100 or the control server 200. Further, the TCU 300 may collect information of the vehicle mounted apparatus 60 (such as, for example, version information of software installed in the vehicle mounted apparatus 60) from the vehicle mounted apparatus 60 and transmit the information of the vehicle mounted apparatus 60 to the control server 200. The TCU 300 may receive the update data of the vehicle mounted apparatus 60 or the content data to be utilized at the vehicle mounted apparatus 60 delivered from the delivery server 100 and provide the data to the vehicle mounted apparatus 60.

On the vehicle 50, in addition to the TCU 300, the vehicle mounted apparatus 60 or the ECU (Electronic Control Unit) 70 are mounted, and the vehicle mounted apparatus 60, the ECU 70 and the TCU 300 are connected via a CAN (Controller Area network) bus 80. The TCU 300 transmits/receives data to/from the delivery server 100 or the control server 200.

The vehicle mounted apparatus 60 is a navigation apparatus or an audio apparatus which is mounted on the vehicle 50. The ECU 70 is, for example, an electronic control apparatus which controls the vehicle 50, and, when an ignition switch is turned on, the ECU 70 notifies the TCU 300 that a state of the ignition switch changes to an ON state.

Figure 2:
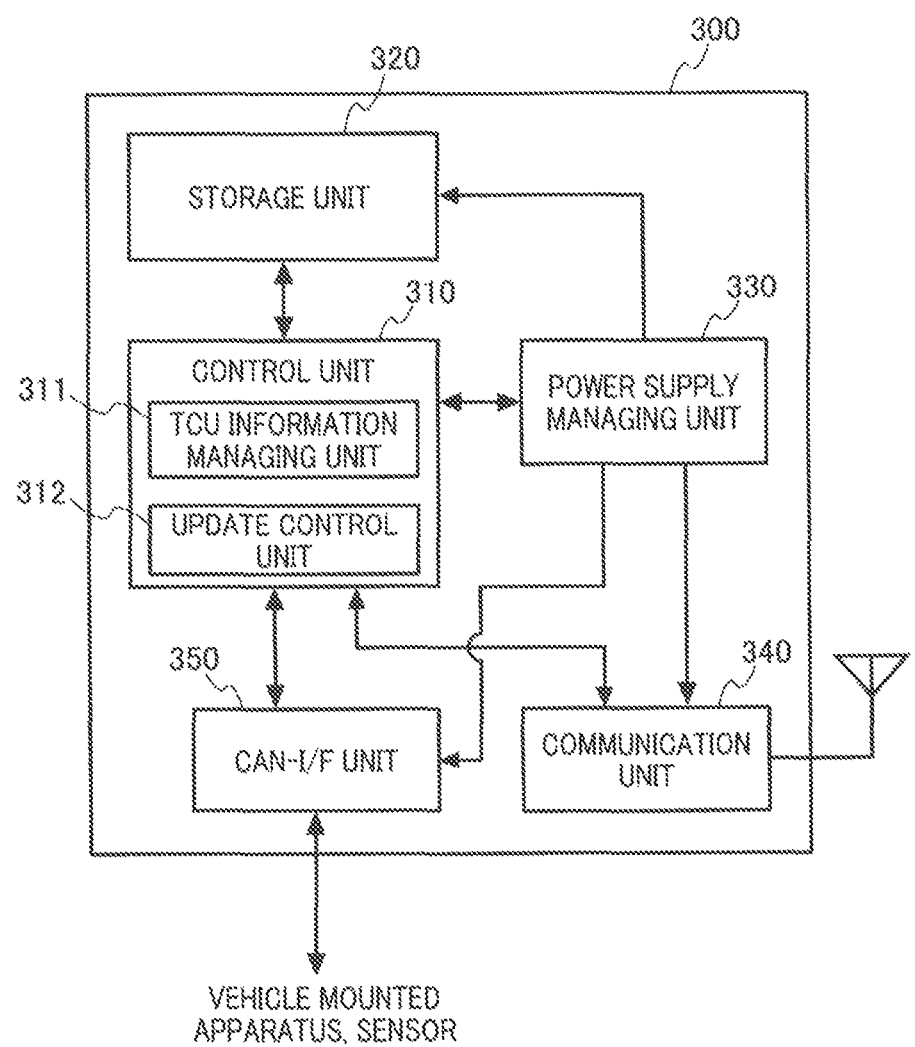
FIG. 2 is a diagram illustrating an example of a hardware configuration of a control server and a delivery server.

An example of a hardware configuration of the TCU 300 will be described next with reference to FIG. 2. The TCU 300 includes a control unit 310, a storage unit 320, a power supply managing unit 330, a communication unit 340 and a CAN-I/F unit 350. The control unit 310 includes a CPU (Central Processing Unit) and a memory which are not illustrated, and integrally controls the TCU 300. Functional blocks within the control unit 310 illustrated in FIG. 2 are realized through cooperation of the hardware such as the CPU and the memory and a program stored in the storage unit 320. The control unit 310 includes a TCU information managing unit 311 and an update control unit 312 as functional blocks.

The storage unit 320 is a non-volatile storage apparatus such as a flash memory and an EEPROM (Electrically Erasable Programmable Read-Only Memory). The storage unit 320 stores data such as a control program, or the like, which is required to be stored also after the TCU 300 is turned off.

The TCU information managing unit 311 collects TCU information of the TCU 300, adds a TCU identification number for identifying the TCU 300 to the collected TCU information, and transmits the TCU information to the control server 200 every predetermined period. The TCU information includes hardware information and software information and a TCU state of the TCU 300. The hardware information is information for identifying hardware mounted on the TCU 300 and includes a model name and a delivery destination of the hardware mounted on the TCU 300. The software information is information for identifying software installed in the TCU 300, and includes a software name and version information. The TCU state is information for managing a state of the TCU 300, and includes mode information and information as to whether or not update is possible. The mode information includes an active mode, a standby mode (low power consumption mode) and an ultra-low power consumption mode. These mode information will be described with description of the power supply managing unit 330. The information as to whether or not update is possible is information indicating whether or not update of software is allowed. This information as to whether or not update is possible is, for example, information which can be set by a user of the vehicle 50, and, when update rejection is set for the information as to whether or not update is possible, even if there is update in the software, update of the software is not performed.

The update control unit 312 controls the communication unit 340 to perform communication with the delivery server 100 and the control server 200, and controls update of the software installed in the TCU 300. The update control unit 312 inputs an SMS (Short Message Service) message transmitted from the control server 200 via the communication unit 340 and analyzes the input SMS message. In the SMS message, a software name, version information, or the like, of the updated software is described. When the update control unit 312 determines that it is necessary to acquire software notified by the SMS message, the update control unit 312 transmits a request for acquiring the update data to the control server 200 via the communication unit 340.

The power supply managing unit 330 is connected to the control unit 310, the storage unit 320, the communication unit 340, the CAN-I/F unit 350, or the like. The TCU 300 has an active mode, a standby mode and an ultra-low power consumption mode as operation modes, and realizes each operation mode of the active mode, the standby mode and the ultra-low power consumption mode by the power supply managing unit 330 controlling power supply to each unit of the TCU 300 according to control by the control unit 310. The active mode (active state) is a mode in which power is supplied to the control unit 310, the storage unit 320, the communication unit 340 and the CAN-I/F unit 350, and the control unit 310 is activated.

The standby mode (standby state) is a state in which power is supplied to the communication unit 340, while power is not supplied to other hardware such as the control unit 310 and the storage unit 320 or less power than that in the active mode is supplied. In the standby mode, for example, when the communication unit 340 receives an SMS message which will be described later, the communication unit 340 outputs an interrupt signal to the control unit 310. The control unit 310 is activated when the interrupt signal is input from the communication unit 340, and controls the power supply managing unit 330 to restart power supply to each unit of the TCU 300. The ultra-low power consumption mode (standby state) is a mode in which power supply to the control unit 310, the storage unit 320, the communication unit 340 and the CAN-I/F unit 350 is all turned off. In the ultra-low power consumption mode, when the ignition switch of the vehicle 50 is turned on, power supply by the power supply managing unit 330 is restarted, and the mode of the TCU 300 transitions to the active mode.

The communication unit 340 which is a communication module, is connected to the mobile communication network 30 to perform wireless communication.

The CAN-I/F unit 350 is an interface connected to a CAN bus 80. The control unit 310 transmits/receives a signal to/from the ECU 70 or the vehicle mounted apparatus 60 through the CAN-I/F unit 350.

Figure 3:
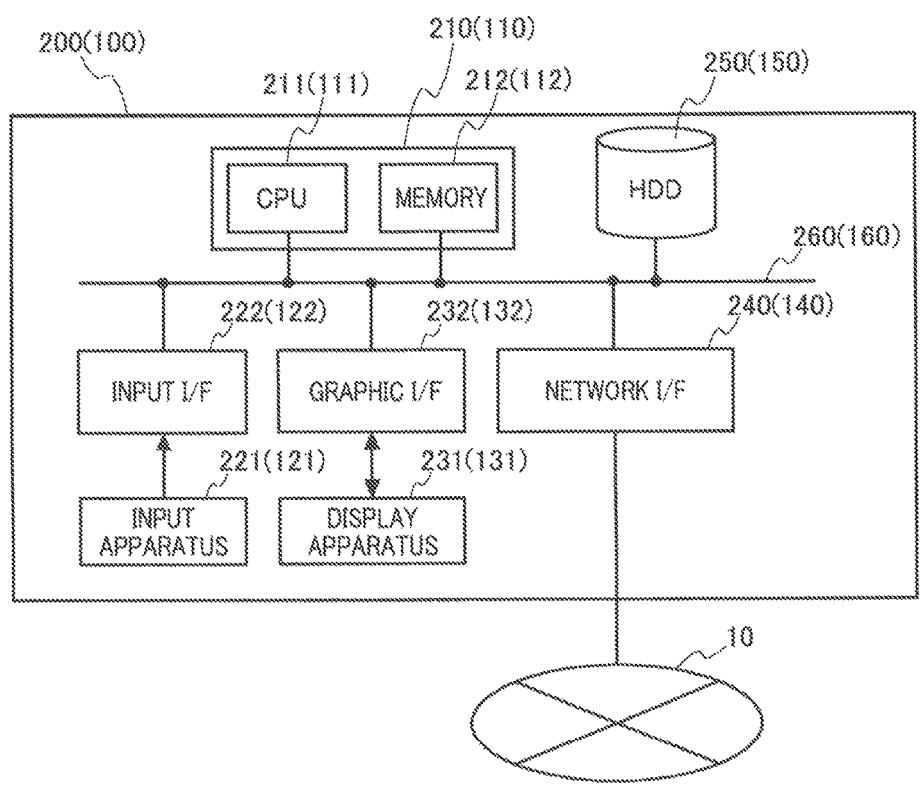
FIG. 3 is a diagram illustrating an example of a TCU management table.

An example of the hardware configuration of the delivery server 100 and the control server 200 will be described next with reference to FIG. 3. Because the delivery server 100 and the control server 200 have substantially the same configuration, a configuration of the control server 200 will be described here on behalf of them. Further, reference numerals in parentheses in FIG. 3 indicate reference numerals of the hardware of the delivery server 100.

The control server 200 includes a control unit 210. The control unit 210 includes a CPU 211 and a memory 212. The CPU 211 and the memory 212 are connected to a bus 260. In the memory 212, a control program, or the like, to be used by the CPU 211 to perform control is stored. The CPU 211 reads out the control program from the hard disc apparatus (hereinafter, described as an HDD) 250 and stores the control program in the memory 212. Then, the CPU 211 performs processing (operation) according to the control program stored in the memory 212. The memory 212 is used as a work memory of the CPU 211, and data to be used by the CPU 211 to perform operation, data after operation by the CPU 211, or the like, is stored in the memory 212. Functional blocks realized through cooperation of the hardware such as the CPU 211 and the memory 212 and the control program will be described later with reference to FIG. 7.

The control server 200 includes an input apparatus 221 and an input interface (hereinafter, an interface will be abbreviated as I/F) 222. The input I/F 222 is connected to the input apparatus 221 and the bus 260. The input apparatus 221 is an input device such as a mouse and a keyboard. When the input apparatus 221 is operated by a user, the input apparatus 221 transmits operation information indicating the accepted operation to the control unit 210 via the input I/F 222. The input I/F 222 inputs the operation information from the input apparatus 221 and transmits the input operation information to the control unit 210 via the bus 260.

The control server 200 includes a graphic I/F 232 and a display apparatus 231. The graphic I/F 232 is connected to the bus 260 and the display apparatus 231. The graphic I/F 232 is an interface for displaying at the display apparatus 231, graphic data processed at the control unit 210. The graphic I/F 232 converts graphic data received from the control unit 210 into a waveform electrical signal so as to display the graphic data on a display screen of the display apparatus 231.

The control server 200 includes a network I/F 240. The network I/F 240 is connected to the bus 260 and the network 10. The network I/F 240 receives input of data transmitted from the control unit 210 and outputs the input data to the network 10. Further, the network I/F 240 transmits the data received via the network 10 to the control unit 210.

The control server 200 includes an HDD 250. The HDD 250 stores a control program to be used by the CPU 211 to perform control. Further, the HDD 250 stores management tables illustrated in FIG. 4 to FIG. 6. Note that, while FIG. 3 illustrates the HDD 250 as an example of the storage apparatus, the storage apparatus is not limited to a hard disc apparatus. For example, the HDD 250 may be a portable storage medium such as a computer-readable flexible disc (FD), DVD (Digital Versatile Disc) and DVD-RAM. Further, the HDD 250 may be a portable storage medium such as a CD-ROM (Compact Disc Read Only Memory), a CD-R (Recordable)/RW (Rewritable), a magnetooptical disc and an IC card.

Configurations of the management tables stored in the HDD 250 of the control server 200 will be described next with reference to FIG. 4 to FIG. 6.

First, a TCU management table will be described with reference to FIG. 4. The TCU management table is a table for managing information of each TCU 300, such as hardware mounted on the TCU 300 and software installed in the TCU 300. In the TCU management table, information as to whether or not an SMS can be transmitted and a phone number are registered in the TCU information transmitted from each TCU 300 in association with a TCU identification number for identifying each TCU 300. The information as to whether or not an SMS can be transmitted is information indicating whether or not transmission of an SMS message to the TCU 300 is allowed. When the software is updated, the control server 200 notifies the TCU 300 in which old version of the updated software is installed of update of the software using the SMS message. The phone number is a phone number of the TCU 300 to be used as an address of the SMS message.

The update management table will be described next with reference to FIG. 5. The update management table is a table for managing delivery of the update data to the TCU 300. In the update management table, priority levels, information as to whether or not an SMS can be transmitted, SMS transmission states, TCU states and version information are registered in association with the TCU identification numbers. The priority level is information set to indicate the order of the TCUs 300 to which the update data is delivered. The control server 200 sets the priority level based on information such as the TCU state, version of the software installed in the TCU 300 and information as to whether or not an SMS can be transmitted. The SMS transmission state is information indicating a transmission state of an SMS message to the TCU 300. The version information is information indicating version of the software installed in the TCU 300.

FIG. 6 illustrates an example of the processing load management table. The processing load management table is a table for managing processing load of the delivery server 100, for example, a use rate of the CPU 111 of the delivery server 100. In the processing load management table, processing load, delivery states and SMS transmission states are registered in association with the TCU identification numbers. The processing load is processing load to be applied upon delivery of the update data to the TCU 300 indicated in the TCU identification number. The delivery state is a delivery state of the update data to the TCU 300 indicated in the TCU identification number. In the present embodiment, the processing load is managed for each TCU 300 which is a delivery destination of the update data. Further, in the processing load management table, total processing load which is a total of processing load for each delivery destination is registered.

Note that, while FIG. 6 illustrates a processing load management table in which processing load of one delivery server 100 is registered, in the case of a configuration where a plurality of delivery servers 100 are provided, processing load of each delivery server 100 is registered in the processing load management table for each delivery server 100.

Figure 7:
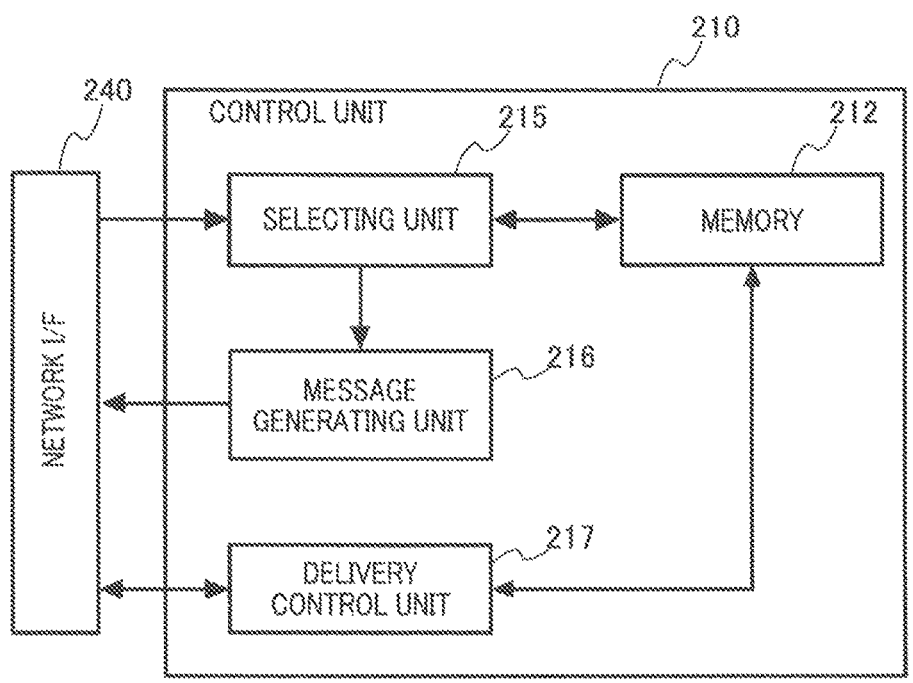
FIG. 7 is a diagram illustrating an example of a hardware configuration of a TCU.

Functional blocks of the control unit 210 of the control server 200 will be described next with reference to FIG. 7. The control unit 210 includes a selecting unit 215, a message generating unit (transmitting unit) 216 and a delivery control unit (receiving unit, determining unit, delivery requesting unit) 217 as functional blocks.

The selecting unit 215 is connected to the network I/F 240, and, when software is updated, the selecting unit 215 receives update notification notified from the delivery server 100 which stores the updated software in the HDD 150. In the update notification, for example, information such as a software name and version information of the updated software is recorded. When the update notification is input from the delivery server 100, the selecting unit 215 first detects information of the TCU 300 in which old version of the software recorded in the update notification is installed with reference to the TCU management table. The selecting unit 215 then determines whether or not the TCU state of the detected TCU 300 is set such that update is allowed. The selecting unit 215 acquires information of the TCU 300 for which the TCU state is set such that update is allowed from the TCU management table and registers the information in a newly created update management table. The information of the TCU 300 acquired from the TCU management table includes a TCU identification number, information as to whether or not an SMS can be transmitted, a TCU state, version information, or the like, illustrated in FIG. 5.

Subsequently, the selecting unit 215 sets a priority level of the TCU 300 to which the update data is to be delivered with reference to the information registered in the update management table. The selecting unit 215 sets the priority level based on, for example, the information as to whether or not an SMS can be transmitted, the TCU state, the version information, or the like, of the TCU 300. For example, when software to be delivered to the TCU 300 is firmware of the TCU 300, the selecting unit 215 sets a higher priority level for the TCU 300 for which the TCU state of the TCU 300 is a standby mode and the information as to whether or not an SMS can be transmitted is set to indicate that transmission is possible than TCUs 300 in other TCU states. When the firmware is updated, the TCU 300 is preferably in a standby mode, because, if the TCU 300 is in an active mode, there is a case where the firmware cannot be updated because the TCU 300 is executing processing.

Further, a case where the TCU 300 is in a standby mode includes, for example, a state where the ignition switch of the vehicle 50 is turned off, and the TCU 300 does not perform communication with the vehicle mounted apparatus 60 or the ECU 70. When the mode of the TCU 300 is a standby mode, the TCU 300 can be activated by the control server 200 transmitting an SMS message to the TCU 300.

When the communication unit 340 of the TCU 300 receives the SMS message, the communication unit 340 outputs an interrupt signal to the control unit 310 to activate the control unit 310. The control unit 310 of the TCU 300 which is activated by receiving the SMS message analyzes the received SMS message and transmits a request for acquiring update data to the control server 200 or the delivery server 100 if necessary.

Further, the selecting unit 215 may set a higher priority level for the TCU 300 whose version of the installed software is old than a priority level for the TCU 300 whose version is new among the TCUs 300 for which the TCU state is set such that update is allowed.

Further, when there are a plurality of pieces of update data, the selecting unit 215 sets a higher priority level for delivery of update data for eliminating a failure of the software than priority levels for delivery of other update data. Because there is a case where delay of update may involve risk, the priority level of the update data for eliminating a failure of the software is set higher.

When the priority levels are set, the selecting unit 215 selects a TCU 300 to which an SMS message is to be transmitted according to the set priority levels. One TCU 300 may be selected, or a plurality of TCUs 300 may be selected. The selecting unit 215 provides a phone number of the selected TCU 300, and a software name, version information, or the like, of the updated software to the message generating unit 216. Further, the selecting unit 215 stores the created update management table in the memory 212.

The message generating unit 216 acquires information such as the phone number, the software name and the version information from the selecting unit 215. The message generating unit 216 generates an SMS message for informing update of software based on the acquired information. The SMS message includes the software name, the version information, or the like. Further, the message generating unit 216 sets the phone number acquired from the selecting unit 215 as an address of the generated SMS message and provides the SMS message to the network I/F 240. The SMS message is output to the network 10 via the network I/F 240 and transmitted to the TCU 300 via switching equipment which is not illustrated, the wireless base station 40, or the like. Note that, in the following description, the SMS message is a message transmitted/received between the control server 200 and the communication unit 340 via the mobile communication network 30 using a circuit switching scheme which uses a phone number as an address. Further, the SMS message may be transmitted/received via an apparatus such as circuit switching equipment which configures part of the mobile communication network 30 and a CTI (Computer Telephony Integration) server which is connected to the mobile communication network 30, which are not illustrated. Still further, while the control server 200 and the communication unit 340 may be configured to be able to perform data communication using a packet switching scheme, an SMS message may be transmitted/received separately from this data communication.

The delivery control unit 217 receives input of a response to the SMS message (hereinafter, referred to as a response message) transmitted from the TCU 300 via the network I/F 240. When the delivery control unit 217 receives the response message from the TCU 300, the delivery control unit 217 first transmits a request for acquiring processing load information of the delivery server 100 to the delivery server 100. When the delivery server 100 receives the request for acquiring processing load information from the control server 200, the delivery server 100 acquires, for example, a CPU use rate of the delivery server 100 as the processing load. The CPU use rate can be, for example, acquired from a task manager. The delivery server 100 acquires the CPU use rate from the task manager for each delivery destination of the update data. The delivery server 100 transmits the acquired CPU use rate to the control server 200 as the processing load information. The control server 200 registers the processing load information acquired from the delivery server 100 in the processing load management table illustrated in FIG. 6.

The delivery control unit 217 selects a TCU 300 to which the update data is to be delivered based on the processing load information received from the delivery server 100 and the response messages received from the TCUs 300. That is, the delivery control unit 217 selects a TCU 300 from the TCUs 300 from which the response messages are received so that the processing load of the delivery server 100 does not become greater than a specified value. When the delivery control unit 217 selects the TCU 300 to which the update data is to be delivered, the delivery control unit 217 instructs the delivery server 100 to deliver the update data to the selected TCU 300.

Figure 8:
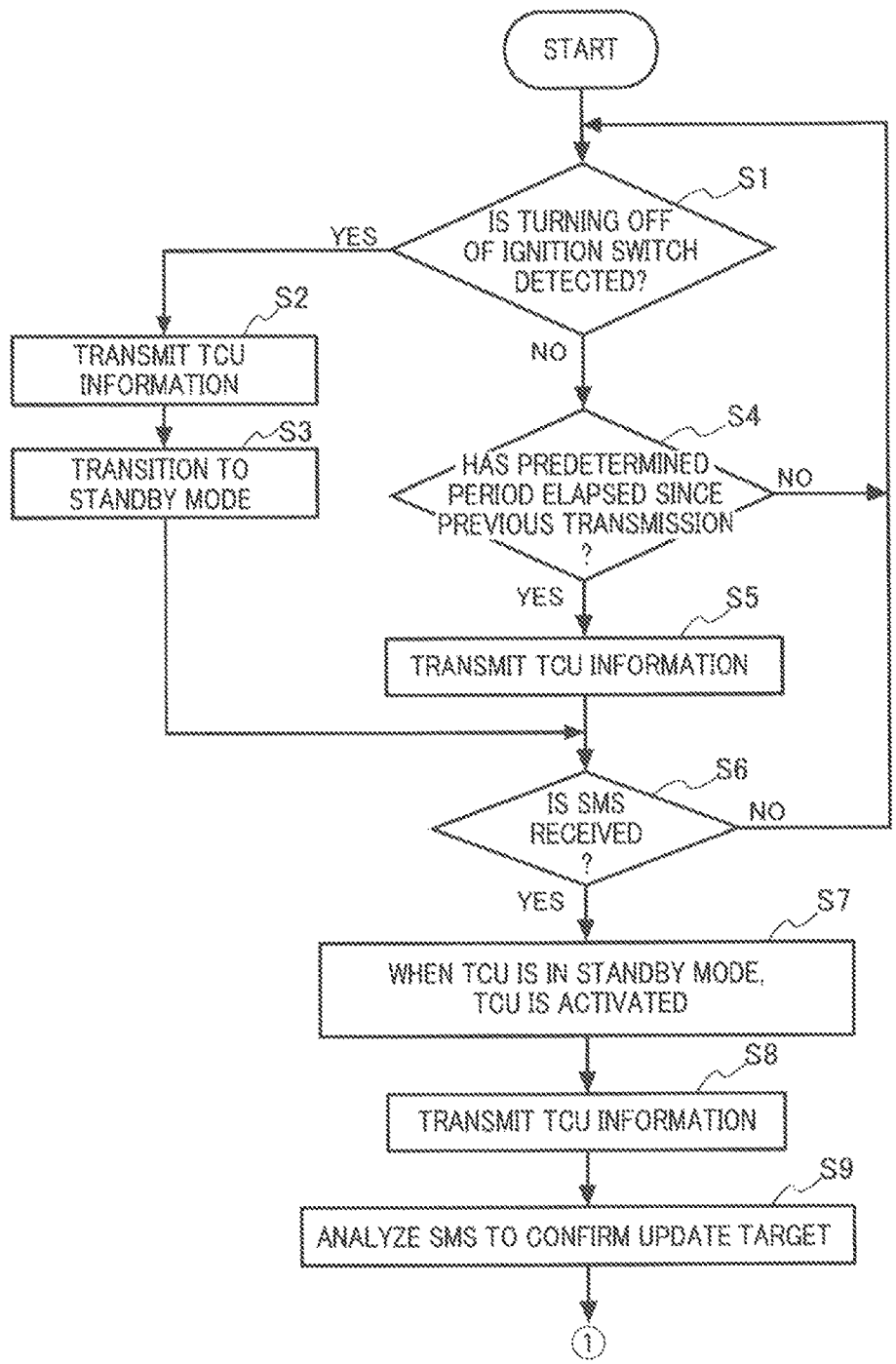
FIG. 8 is a flowchart illustrating processing procedure of a control unit of the TCU.
Figure 9:
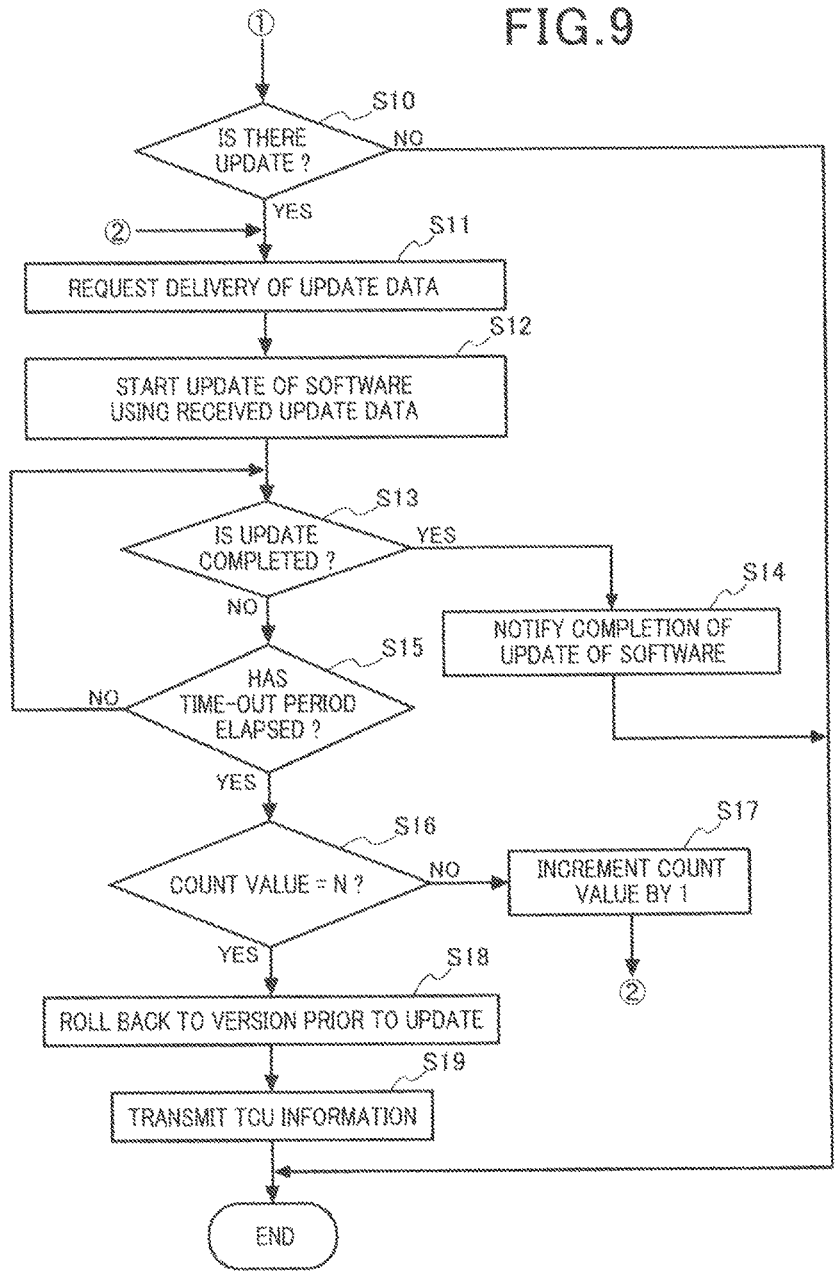
FIG. 9 is a flowchart illustrating the rest of the processing procedure of the control unit of the TCU.

First processing procedure of the TCU 300 will be described next with reference to the flowcharts illustrated in FIG. 8 and FIG. 9.

The control unit 310 of the TCU 300 first determines whether or not turning off of the ignition switch is detected (step S1). The control unit 310 determines whether or not the ignition switch is turned off based on, for example, a signal input from the ECU 70 mounted on the vehicle 50 via the CAN bus 80 (step S1). When it is determined that the ignition switch is turned off (step S1/Yes), the control unit 310 transmits TCU information to the control server 200 (step S2). The TCU information includes software information, hardware information, a TCU state, a TCU identification number, or the like. When the control unit 310 transmits the TCU information to the control server 200, the control unit 310 controls the power supply managing unit 330 to make a mode transition to a standby mode in which power consumption is reduced (step S3).

Further, in step S1, when turning off of the ignition switch cannot be detected (step S1/No), the control unit 310 determines whether or not a predetermined period has elapsed since previous transmission of the TCU information (step S4). When the predetermined period has not elapsed since the previous transmission of the TCU information (step S4/No), the control unit 310 returns to determination in step S1. Further, when the predetermined period has elapsed since the previous transmission of the TCU information (step S4/Yes), the control unit 310 transmits the TCU information again to the control server 200 (step S5).

Subsequently, the control unit 310 determines whether or not an SMS message transmitted from the control server 200 is received (step S6). Further, when the TCU 300 is in a standby mode, and when the communication unit 340 receives the SMS message transmitted from the control server 200 (step S6/Yes), the TCU 300 is activated (step S7). When an SMS message is received (step S6/Yes) or when the TCU 300 is activated by receiving an SMS message (step S7), the control unit 310 transmits the TCU information to the control server 200 (step S8). When the control unit 310 transmits the TCU information to the control server 200, the control unit 310 analyzes the SMS message received in step S6 and determines whether or not it is necessary to receive delivery of update data from the delivery server 100 (step S9). When it is determined that it is necessary to receive delivery of update data (step S10/yes), the control unit 310 requests the delivery server 100 to deliver update data (step S11). When delivery of update data by the delivery server 100 is started, the TCU 300 receives the update data delivered from the delivery server 100 at the communication unit 340. The control unit 310 receives input of the update data received at the communication unit 340 and starts update of software (step S12). Then, the control unit 310 determines whether or not update of the software is completed (step S13). When update of the software is completed (step S13/Yes), the control unit 310 notifies the delivery server 100 that update of the software is completed (step S14).

Further, in step S13, when update of the software is not completed (step S13/No), the control unit 310 determines whether or not a time-out period has elapsed since update is started (step S15). When the time-out period has not elapsed (step S15/No), the processing returns to step S13, where the control unit 310 determines again whether or not update of the software is completed (step S13). Meanwhile, when the time-out period has elapsed (step S15/Yes), the control unit 310 determines whether or not a value of a counter which counts the number of times of retry reaches a specified value N (N is an arbitrary natural number) (step S16). The number of times of retry is, for example, the number of times the TCU 300 requests the delivery server 100 to deliver update data when update data cannot be acquired within a predetermined period (time-out period) due to a communication failure, or the like, and update of the software is not completed. When the control unit 310 determines that the value of the counter does not reach the specified value N (step S16/No), the control unit 310 increments the value of the counter by 1 (step S17) and requests the delivery server 100 to deliver update data again (step S11). Further, when the value of the counter reaches the specified value N (step S16/Yes), the control unit 310 finishes update of the software using the update data and rolls back the software to version prior to update (step S18). When the software is rolled back to the version prior to update, the control unit 310 transmits the TCU information to the control server 200 (step S19) and finishes this processing.

Processing procedure of the control server 200 will be described next with reference to the flowchart illustrated in FIG. 10.

When the software stored in the delivery server 100 is updated and the control unit 210 of the control server 200 receives update notification of the software from the delivery server 100 (step S21/Yes), the control unit 210 of the control server 200 selects a TCU 300 to which update data is to be delivered with reference to the update management table (step S22). The control unit 210, for example, selects a predetermined number of TCUs 300 whose priority levels are higher according to the priority levels set in the update management table illustrated in FIG. 5 (step S22). When the control unit 210 selects the TCU 300, the control unit 210 generates an SMS message and transmits the generated SMS message to the selected TCU 300 (step S23). When the control unit 210 transmits the SMS message, the control unit 210 determines whether or not a request for acquiring update data is received as a response message from the TCU 300 (step S24). When the request for acquiring the update data is not received (step S24/No), the control unit 210 determines whether or not a predetermined period has elapsed since transmission of the SMS message (step S25). When the predetermined period has not elapsed since transmission of the SMS message (step S25/No), the processing returns to step S24, where the control unit 210 stands by until receiving a request for acquiring a message. Meanwhile, when the predetermined period has elapsed since transmission of the SMS message (step S25/Yes), the control unit 210 determines whether or not update data is transmitted to all the TCUs 300 for which it is set that update is allowed (step S32). When it is determined that update data has been transmitted to all the TCUs 300 for which it is set that update is allowed (step S32/Yes), the control unit 210 finishes this processing. Further, when it is determined that update data has not been transmitted to all the TCUs 300 for which it is set that update is allowed (step S32/No), the processing returns to step S22, where the control unit 210 selects a TCU 300 to which an SMS message is to be transmitted (step S22).

Further, in step S24, when an acquisition request is received from the TCU 300 (step S24/Yes), the control unit 210 requests the delivery server 100 to acquire processing load information of the delivery server 100 (step S26). The delivery server 100 which receives the acquisition request, for example, acquires processing load information such as a CPU use rate from the task manager and transmits the acquired processing load information to the control server 200. When the processing load information is acquired from the delivery server 100 (step S27/Yes), the control unit 210 determines whether or not the processing load of the delivery server 100 is equal to or greater than a specified value (step S28). When the processing load of the delivery server 100 is equal to or greater than the specified value (step S28/Yes), the control unit 210 determines not to newly delivery update data to the TCU 300, does not request the delivery server 100 to deliver data, and, if there is other processing currently being executed, continues the processing (step S29). Then, the control unit 210 determines whether or not a predetermined period has elapsed since the determination in step S28 (step S30). When the control unit 210 determines that the predetermined period has elapsed since the determination in step S28 (step S30/Yes), the processing returns to step S26, where the control unit 210 transmits a request for acquiring the processing load information to the delivery server 100 (step S26).

Further, in the determination in step S28, when it is determined that the processing load of the delivery server 100 is less than the specified value (step S28/No), the control unit 210 requests the delivery server 100 to deliver update data to the TCU 300 from which the acquisition request is received (step S31). The control unit 210 then determines whether or not update data is transmitted to all the TCUs 300 for which it is set that update is allowed (step S32). When it is determined that update data is transmitted to all the TCUs 300 for which it is set that update is allowed (step S32/Yes), the control unit 210 finishes this processing. Meanwhile, when it is determined that update data is not transmitted to all the TCUs 300 for which it is set that update is allowed (step S32/No), the processing returns to step S22, where the control unit 210 selects a TCU 300 to which an SMS message is to be transmitted (step S22).

Figure 10:
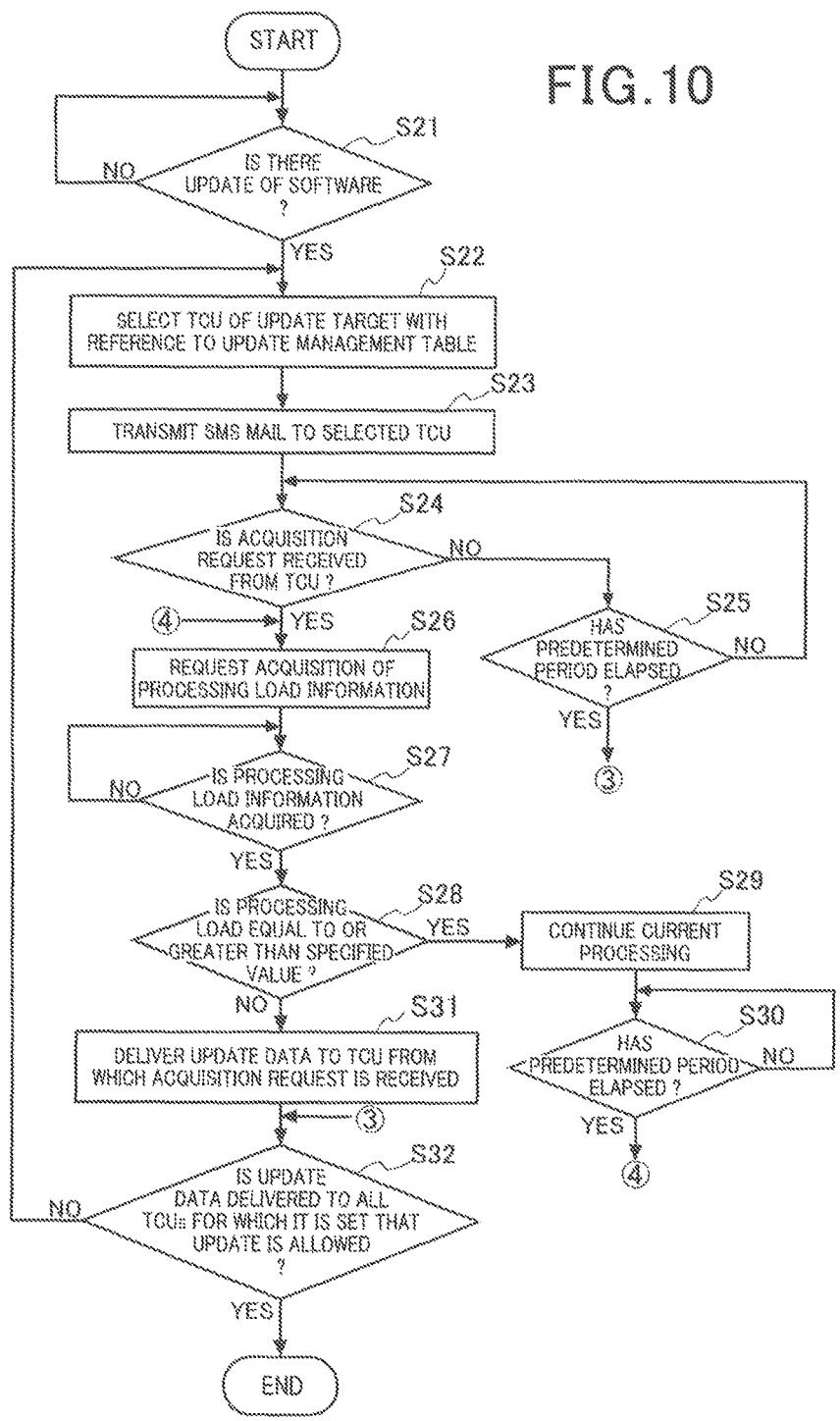
FIG. 10 is a flowchart illustrating processing procedure of a control server.

While, in the processing flow illustrated in FIG. 10, whether or not the delivery server 100 can deliver update data is determined after the processing load of the delivery server 100 is determined based on the processing load information such as a CPU use rate, whether or not the delivery server 100 can deliver update data may be determined based on load of a line through which the update data is delivered.

For example, a system configuration is assumed where a plurality of delivery servers 100 are provided and connection to the network 10 is realized using lines which are less than the number of the plurality of delivery servers 100. In this case, because the control server 200 selects a delivery server 100 for delivering update data, the control server 200 first acquires a network use rate (a use rate of the network I/F 140 of the delivery server 100) from each delivery server 100. The delivery server 100 can acquire the network use rate from the task manager.

When the control server 200 acquires the network use rate and the CPU use rate from each delivery server 100, the control server 200 calculates line load (a ratio of a use amount with respect to a maximum communication capacity of a communication line connecting the delivery server 100 and a connection apparatus (not illustrated) which connects the delivery server 100 to the network 10) based on the acquired network use rate.

When the calculated line load of each line is equal to or greater than a specified value, the control server 200 does not transmit a request for delivering update data to the delivery server 100 until the line load decreases to a value set in advance.

Further, when the control server 200 detects a line whose line load is less than a specified value, the control server 200 calculates line load in the case where each update data is delivered to the TCU 300 based on a data amount of each update data to be delivered to the TCU 300 while excluding update data currently being delivered to the TCU 300. The control server 200 detects a line through which update data can be delivered based on the calculated line load and specifies a delivery server 100 connected to this line. The control server 200 determines whether or not the specified delivery server 100 can deliver update data based on the CPU use rate of the specified delivery server 100. When it is determined that the specified delivery server 100 can deliver update data, the control server 200 requests the specified delivery server 100 to deliver update data to the TCU 300.

Further, when it is determined that the specified delivery server 100 cannot deliver update data, the control server 200 stands by for a period set in advance and stands by until line load of the line decreases.

Still further, when there is a line which is not being used for communication, the control server 200 detects a delivery server 100 whose CPU use rate is the lowest and requests this delivery server 100 to deliver update data.

Figure 11:
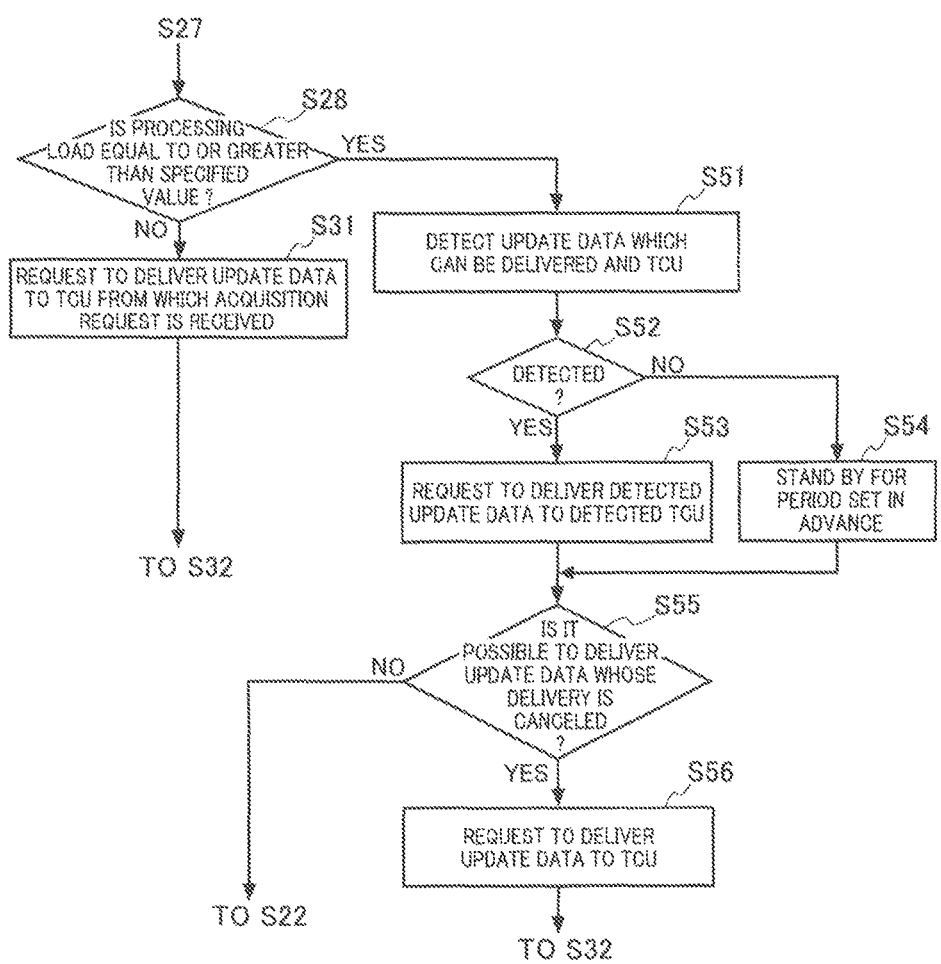
FIG. 11 is a flowchart illustrating processing procedure of the control server.

Further, the processing flow of the control server 200 illustrated in FIG. 10 may be processing flow illustrated in FIG. 11. Note that, because the processing flow until step S28 is the same as the flow illustrated in FIG. 10, explanation thereof will be omitted.

The control unit (delivery control unit 217) 210 of the control server 200 acquires processing load information from the delivery server 100 and determines whether or not the processing load of the delivery server 100 is equal to or greater than a specified value based on the acquired processing load information (step S28). When the control unit 210 determines that the processing load of the delivery server 100 is equal to or greater than the specified value (step S28/Yes), the control unit 210 detects update data which can be delivered without making the processing load of the delivery server 100 exceed the specified value and a TCU 300 to which this update data is to be delivered (step S51).

For example, a data amount becomes larger and the processing load of the delivery server 100 becomes greater when both the update data of the software and content data is delivered than when only update data of the software is delivered to the TCU 300. Further, when a data amount is different for each update data, while, if update data having a larger data amount is delivered to the TCU 300, the processing load of the delivery server 100 becomes equal to or greater than the specified value, if update data having a smaller data amount is delivered, there is a case where the update data can be delivered to the TCU 300 without making the processing load of the delivery server 100 exceed the specified value. Therefore, the control unit 210 determines whether or not there is another TCU 300 to which update data can be delivered without making the processing load of the delivery server 100 exceed the specified value.

When update data which can be delivered without making the processing load exceed the specified value, and a delivery destination to which this update data is to be delivered are detected (step S52/Yes), the control unit 210 requests the delivery server 100 to deliver the detected update data to the detected TCU 300 (step S53). Further, in step S51, when update data which can be delivered and a delivery destination cannot be detected (step S52/No), the control unit 210 stands by for a period set in advance (step S54), and the processing shifts to processing in step S55. In determination in step S55, the control unit 210 determines whether or not update data whose delivery is canceled can be delivered to the TCU 300 from which the acquisition request is received in step S24 (step S55). That is, the control unit 210 determines whether or not the processing load of the delivery server 100 is equal to or less than the specified value even when the update data whose delivery is canceled is delivered to the TCU 300 from which the acquisition request is received. When it is determined that the update data can be delivered (step S55/Yes), the control unit 210 requests the delivery server 100 to deliver the update data whose delivery is canceled to the TCU 300 from which the acquisition request is received (step S56). The control unit 210 then shifts to processing in step S32 illustrated in FIG. 10. Further, in the determination in step S55, when it is determined that the update data whose delivery is canceled cannot be delivered (step S55/No), the control unit 210 returns to step S22 illustrated in FIG. 10 and selects a TCU 300 which is a new update target.

Figure 12:
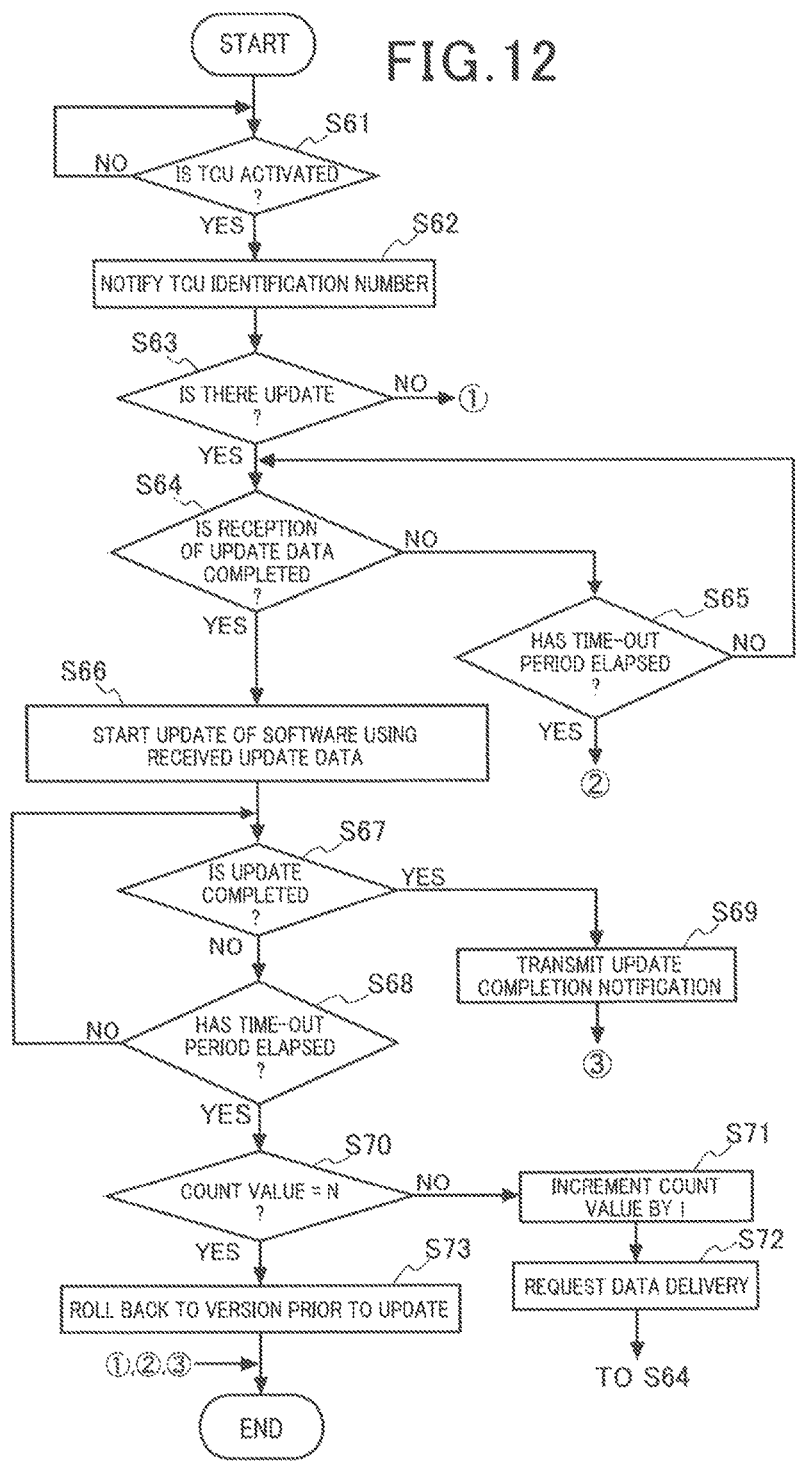
FIG. 12 is a flowchart illustrating processing procedure of the control unit of the TCU.
Figure 13:
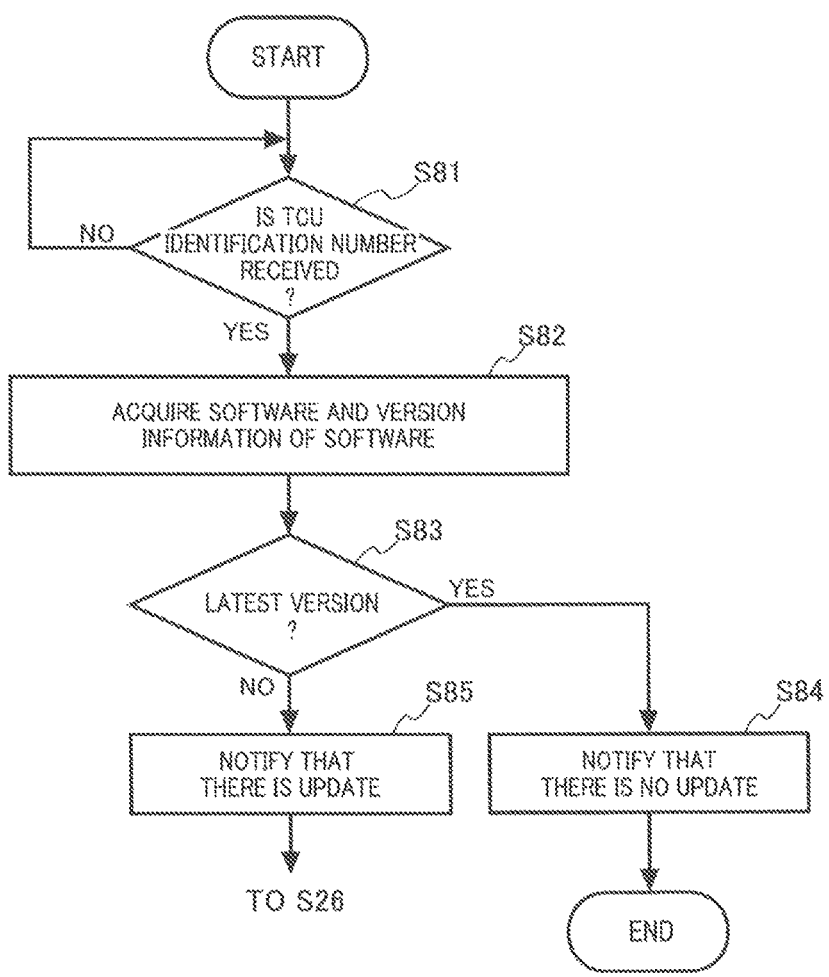
FIG. 13 is a flowchart illustrating processing procedure of the control server.

Second processing procedure of the TCU 300 and the control server 200 will be described next with reference to flowcharts illustrated in FIG. 12 and FIG. 13. FIG. 12 illustrates processing procedure of the TCU 300, and FIG. 13 illustrates processing procedure of the control server 200.

When the control unit 310 of the TCU 300 is activated by an accessory switch of the vehicle 50 being turned on (step S61), the control unit 310 is connected to the control server 200 by the communication unit 340 and notifies the control server 200 of a TCU identification number (identification information of the communication apparatus) (step S62).

The processing procedure of the control server 200 which is notified of the TCU identification number will be described with reference to FIG. 13.

When the control server 200 receives the TCU identification number transmitted by the TCU 300 (step S81/Yes), the control server 200 acquires software installed in the TCU from which the TCU identification number is received (in this flow, referred to as a target TCU) 300 and version information of this software with reference to the TCU management table (step S82). When the control server 200 acquires the software installed in the target TCU 300 and the version information, the control server 200 determines whether or not the version of the software installed in the target TCU 300 is the latest version (step S83). When it is determined that the version of the installed software is the latest version (step S83/Yes), the control server 200 notifies the target TCU 300 that "there is no update" of the software and finishes the processing (step S84). Further, when it is determined that the version of the installed software is not the latest version (step S83/No), the control server 200 notifies the target TCU 300 that "there is update" of the software (step S85).

The control server 200 then performs processing from step S26 to S31 illustrated in FIG. 10. That is, the control server 200 acquires processing load information from the delivery server 100 (step S27), and determines whether or not the processing load of the delivery server 100 is equal to or greater than the specified value (step S28). When the processing load of the delivery server 100 is not equal to or greater than the specified value (step S28/No), the control server 200 requests the delivery server 100 to deliver update data to the TCU 300 of the received TCU identification number (step S31). Further, when the processing load of the delivery server 100 is equal to or greater than the specified value (step S28/Yes), the control server 200 stands by for a predetermined period set in advance (step S30/Yes), acquires the processing load information from the delivery server 100 and repeats processing of determining whether or not the processing load of the delivery server 100 is equal to or greater than the specified value.

Returning to the flowchart illustrated in FIG. 12, the processing procedure of TCU 300 will be continuously described.

When the TCU 300 receives notification that "there is no update" from the control server 200 (step S63/No), the TCU 300 is disconnected with the control server 200 and finishes this processing flow.

Further, when the TCU 300 receives notification that "there is update" from the control server 200 (step S63/Yes), the TCU 300 is connected to the delivery server 100 by control by the control server 200. When the target TCU 300 is connected, the delivery server 100 delivers update data of software designated from the control server 200 to the target TCU 300.

When reception of the update data delivered from the delivery server 100 is started, the control unit 310 of the TCU 300 starts timing of an elapsed time using a timer. The control unit 310 stands by for completion of reception of update data until the elapsed time timed by the timer reaches a period set in advance (referred to as a time-out period) (step S64/No, and S65/No). When reception of the update data is not completed even after the elapsed time timed by the timer reaches the time-out period (step S64/No, and S65/Yes), the control unit 310 finishes reception of the update data and finishes this processing flow.

Further, when reception of the update data is completed before the elapsed time timed by the timer reaches the time-out period (step S64/Yes), the control unit 310 installs the received update data and starts update of the software (step S66). Because the subsequent processing flow is the same as the processing flow described in FIG. 8 and FIG. 9, explanation thereof will be omitted.

In the processing flow illustrated in FIG. 12, while acquisition of the update data is requested to the control server 200 when the control unit 310 of the TCU 300 is activated, a timing at which the control unit 310 requests the control server 200 to acquire the update data is not limited to upon activation of the control unit 310.

For example, the TCU 300 may request the control server 200 to acquire the update data once a week at time set in advance on the day of the week set in advance or an operator may manipulate the vehicle mounted apparatus 60 to instruct the TCU 300 to request the control server 200 to acquire the update data.

Further, the TCU 300 may request the control server 200 to acquire the update data at a timing when the vehicle mounted apparatus 60 is manipulated to perform route search. Still further, when route search is performed in the vehicle mounted apparatus 60, and a route to which the user is to be guided is detected, the TCU 300 may transmit information of the route to which the user is to be guided to the control server 200 to inquire as to whether or not there is update in map data including the route to which the user is to be guided. The control server 200 determines whether or not there is update in the map data including the route to which the user is to be guided based on information of the route to which the user is to be guided received from the TCU 300, and, when there is updated map data, the control server 200 instructs delivery server 100 to deliver the updated map data.

Further, as another processing flow of the control server 200, it is also possible to change processing performed by the control server 200 while taking into account importance of data to be delivered to the TCU 300.

For example, when the updated data is content data such as map data, and when the control server 200 accepts an inquiry about update from a TCU 300, the control server 200 detects content data to be delivered to the TCU 300 and requests the delivery server 100 to deliver the detected content data to the TCU 300.

Further, when the updated data is update data of software, or, particularly, update data for eliminating a failure of software, the control server 200 determines that the updated data is important data, and the control server 200 itself detects a TCU 300 in which the corresponding software is installed. The control server 200 then requests the delivery server 100 to deliver the software or update data of the software to the detected TCU 300.

As described in detail above, the control server 200 according to the present embodiment selects a TCU 300 to which update data is to be delivered based on priority levels set in association with TCUs 300 which are delivery targets. The control server 200 then transmits an SMS message to the selected TCU 300 and delivers the update data to the TCU 300 which responds to the SMS message. Therefore, according to the present embodiment, it is possible to select a TCU 300 which has a higher priority level and to which update data can be delivered, and deliver the update data. Therefore, it is possible to reduce processing load of the delivery server 100 compared to a case where update data is transmitted to the plurality of TCUs 300 at the same time.

Further, because a TCU 300 to which update data is to be delivered is selected based on processing load to be applied upon delivery of the update data, it is possible to prevent the processing load of the delivery server 100 from becoming high.

Further, because the priority level is set based on at least information as to whether or not the TCU 300 is a TCU 300 for which update of software is allowed, and information indicating whether or not a state of the TCU 300 is an active mode or a standby mode, it is possible to preferentially deliver update data to the TCU 300 which can receive update data.

Further, when the mode of the TCU 300 is a standby mode, update data is delivered after the mode of the TCU 300 is made an active mode by transmitting an SMS message to the TCU 300. Therefore, it is possible to prevent occurrence of a case where the TCU 300 cannot receive update data because the update data is delivered to the TCU 300 in a standby mode.

Further, when the update data is data for eliminating a failure of software installed in the TCU 300, the priority level of the TCU 300 to which this update data is to be delivered is set higher than priority levels of TCUs 300 to which other update data is to be delivered. Because delay of update may involve a risk, the priority level of the update data for eliminating a failure of software is set higher, so that the update data can be preferentially delivered.

The above-described embodiment is a preferred embodiment of the present invention. However, the present invention is not limited to this, and various modifications are possible without departing from the spirit and scope of the present invention.

For example, in the above-described embodiment, the delivery server 100 which stores update data and which delivers the update data, and the control server 200 which selects a TCU 300 which is a delivery destination to which the update data is to be delivered are configured as separate servers. In addition to this, it is also possible to provide functions of the control server 200 to the delivery server 100 so that the delivery server 100 can select a TCU 300 to which the update data is to be delivered and deliver the update data to the selected TCU 300.

Further, when the vehicle mounted apparatus 60 has a navigation function, it is also possible to set whether or not to deliver update data to the corresponding TCU 300 according to whether or not the vehicle mounted apparatus 60 is executing routing assistance.

For example, the TCU 300 acquires information as to whether or not the vehicle mounted apparatus 60 of the vehicle 50 is executing routing assistance and transmits the information to the control server 200. The control unit 210 of the control server 200 registers the information as to whether or not the vehicle mounted apparatus 60 is executing routing assistance, transmitted from the TCU 300, in the TCU management table in association with the TCU identification number.

When the vehicle mounted apparatus 60 is executing routing assistance, the control unit 210 performs setting so that update data is not delivered to the TCU 300 of the vehicle 50 on which this vehicle mounted apparatus 60 is mounted. Further, the control unit 210 sets a lower priority level for delivery of update data set for the TCU 300 of the vehicle 50 on which the vehicle mounted apparatus 60 which is executing routing assistance is mounted than a priority level for a TCU 300 of the vehicle 50 on which the vehicle mounted apparatus 60 which does not execute routing assistance is mounted.

Further, when the vehicle 50 is a vehicle on which a self-driving system is mounted, it is also possible to determine whether or not to deliver update data to the corresponding TCU 300 according to whether or not the vehicle 50 is executing self-driving.

For example, the TCU 300 acquires information as to whether or not the self-driving system of the vehicle 50 is executing self-driving control and transmits the information to the control server 200. The control unit 210 of the control server 200 registers the information as to whether or not the self-driving system is executing self-driving control, transmitted from the TCU 300, in the TCU management table in association with the TCU identification number.

When the self-driving system is executing self-driving control, the control unit 210 performs setting so that update data is not delivered to the TCU 300 of the vehicle 50 on which this self-driving system is mounted. Further, the control unit 210 sets a lower priority level for the TCU 300 of the vehicle 50 in which the self-driving system is executing self-driving control than a priority level for the TCU 300 of the vehicle 50 on which the vehicle mounted apparatus 60 which is not executing self-driving control is mounted.

Further, it is also possible to register a user name of a user of the vehicle 50, identification information for identifying a user and attribute information of a user in the TCU management table in association with the TCU identification number and set a priority level for delivery of update data according to the user. The attribute information of the user is, for example, information as to whether the user is a paid member or a free member, and a priority level for delivery of update data to a paid member is set higher than a priority level for delivery of update data to a free member.

Further, it is also possible to set a priority level for delivery of update data according to whether or not the vehicle 50 is a vehicle on which a self-driving system is mounted.

Information as to whether the vehicle 50 is a vehicle on which a self-driving system is mounted or a vehicle on which a self-driving system is not mounted is registered in the TCU management table in association with the TCU identification number of the TCU 300 mounted on the vehicle 50. The control unit 210 of the control server 200 inquires as to whether or not the self-driving system of the vehicle 50 is in operation to the TCU 300 to which update data is to be delivered when a priority level of the TCU 300 to which update data is to be delivered is set. When the control unit 210 acquires information as to whether or not the self-driving system is in operation from the TCU 300, the control unit 210 sets the highest priority level for the TCU 300 of the vehicle 50 on which the self-driving system is mounted and which is not currently self-driving with reference to the TCU management table. Further, the control unit 210 sets a higher priority level for the TCU 300 of the vehicle 50 on which the self-driving system is not mounted than a priority level for the TCU 300 of the vehicle 50 on which the self-driving system is mounted and in which the self-driving system is currently in operation.

Further, it is also possible to set a priority level for delivery of update data based on time elapsed since previous update.

For example, when delivery of update data is completed, the control unit 210 of the control server 200 registers date and time the delivery is completed (referred to as update completion date and time) in the TCU management table in association with the TCU identification number of the TCU 300 to which the update data is delivered. The control unit 210 then sets a higher priority level for the TCU 300 whose update completion date and time registered in the TCU management table is old when creating an update management table by occurrence of new update data.

The invention claimed is:

1. A data delivery system comprising a plurality of communication apparatuses, and a control server selecting a communication apparatus to which update data is to be delivered from among the plurality of communication apparatuses, the control server comprising:
a CPU includes:
a selecting unit selecting the communication apparatus to which the update data is to be delivered based on priority levels set in association with communication apparatuses which are delivery targets;
a transmitting unit transmitting a message inquiring as to whether or not the communication apparatus is ready to accept the update data, to the communication apparatus selected by the selecting unit;
a receiving unit receiving a response message transmitted by the communication apparatus in response to the message transmitted by the transmitting unit; and
a delivery requesting unit selecting the communication apparatus to which the update data is to be delivered based on the response message received by the receiving unit and requesting a delivery server which stores the update data to deliver the update data to the selected communication apparatus,
wherein when the response message is received by the receiving unit, the delivery requesting unit requests the delivery server to acquire processing load of the delivery server to be applied upon delivery of the update data,
the control server compares the processing load of the delivery server, which is applied upon delivery of the update data, with a pre-set value, and when the control server determines that the processing load of the delivery server to be applied upon delivery of the update data is less than the pre-set value, the delivery requesting unit of the control server requests the delivery server to deliver the update data to the selected communication apparatus from which the response message is received.

2. The data delivery system according to claim 1, wherein, when the control server determines that the processing load of the delivery server to be applied upon delivery of the update data is equal to or greater than the pre-set value, the delivery requesting unit newly selects update data for which the processing load of the delivery server is less than the pre-set value and a communication apparatus to which the update data is to be delivered.

3. The data delivery system according to claim 1, wherein the selecting unit sets the priority levels for the communication apparatuses which are the delivery targets based on at least one of information as to whether or not the communication apparatuses are set such that update of data is allowed and information as to whether the communication apparatuses are in an active state or a standby state in which power consumption is reduced compared to in the active state.

4. The data delivery system according to claim 3, wherein the plurality of communication apparatuses transmit information indicating whether the communication apparatuses are in the active state or the standby state and information as to whether or not the communication apparatuses are set such that update of data is allowed every predetermined period to the control server.

5. The data delivery system according to claim 1, wherein the transmitting unit transmits the message to the selected communication apparatus via a mobile communication network to activate the communication apparatus which is in the standby state in which power consumption is reduced, and
the delivery requesting unit requests the delivery server to deliver the update data to the communication apparatus from which the response message in response to the message is received.

6. The data delivery system according to claim 1, wherein, when there are a plurality of pieces of update data and the plurality of pieces of update data include update data for eliminating a failure of data installed in the communication apparatus, the selecting unit sets a higher priority level for the communication apparatus to which the update data for eliminating the failure is to be delivered than priority levels for communication apparatuses to which other update data is to be delivered.

7. A control server comprising:
a CPU including:
a receiving unit receiving an acquisition request including identification information of a communication apparatus and requesting update data from the communication apparatus;
a determining unit determining whether or not there is update data corresponding to the communication apparatus based on the identification information when the acquisition request is received by the receiving unit; and
a delivery requesting unit requesting a delivery server which stores the update data to deliver the update data when there is update data corresponding to the communication apparatus,
wherein when the response message is received by the receiving unit, the delivery requesting unit requests the delivery server to acquire processing load of the delivery server to be applied upon delivery of the update data,
the control server compares the processing load of the delivery server, which is applied upon delivery of the update data, with a pre-set value, and when the control server determines that the processing load of the delivery server to be applied upon delivery of the update data is less than the pre-set value, the delivery requesting unit of the control server requests the delivery server to deliver the update data to the communication apparatus from which the response message is received.

8. A data delivery method in a data delivery system which comprises a plurality of communication apparatuses and a control server selecting a communication apparatus to which update data is to be delivered from among the plurality of communication apparatuses,
the data delivery method comprising:
a selecting step of selecting at the control server, the communication apparatus to which the update data is to be delivered based on priority levels set in association with communication apparatuses which are delivery targets;
a transmitting step of transmitting by a transmitting unit, a message inquiring as to whether or not the communication apparatus is ready to accept the update data, to the selected communication apparatus;
a receiving step of receiving at a receiving unit, a response message transmitted by the communication apparatus in response to the message transmitted by the transmitting unit; and
a delivery requesting step of selecting the communication apparatus to which the update data is to be delivered based on the response message received at the receiving unit and requesting a delivery server which stores the update data to deliver the update data to the selected communication apparatus,
wherein when the response message is received by the receiving step, the delivery requesting step requests the delivery server to acquire processing load of the delivery server to be applied upon delivery of the update data, further comprising: a comparing step comparing the processing load of the delivery server, which is applied upon delivery of the update data, with a pre-set value, wherein
when the comparing step determines that the processing load of the delivery server to be applied upon delivery of the update data is less than the pre-set value, the delivery requesting step requests the delivery server to deliver the update data to the selected communication apparatus from which the response message is received.

9. The data delivery method according to claim 8,
wherein the step of comparing determines that the processing load of the delivery server to be applied upon delivery of the update data is equal to or greater than the pre-set value, the delivery requesting step newly selects update data for which the processing load of the delivery server is less than the pre-set value set and a communication apparatus to which the update data is to be delivered.

10. The data delivery method according to claim 8,
wherein the selecting step comprises setting the priority levels for the communication apparatuses which are delivery targets based on at least one of information as to whether or not the communication apparatuses are set such that update of data is allowed and information indicating whether the communication apparatuses are in an active state or a standby mode in which power consumption is reduced compared to in the active state.

11. The data delivery method according to claim 8,
wherein the transmitting step comprises transmitting the message to the selected communication apparatus via a mobile communication network to activate the communication apparatus which is in the standby mode in which power consumption is reduced, and
the delivery requesting step comprises requesting the delivery server to deliver the update data to the communication apparatus from which the response message in response to the message is received.

12. The data delivery method according to claim 8,
wherein the selecting step comprises, when there are a plurality of pieces of update data and the plurality of pieces of update data include update data for eliminating a failure of data installed in the communication apparatus, setting a higher priority level for a communication apparatus to which the update data for eliminating the failure is to be delivered than priority levels for communication apparatuses to which other update data is to be delivered.

13. A data delivery method in a control server which includes a CPU, the data delivery method comprising:
a receiving step of receiving an acquisition request including identification information of a communication apparatus and requesting update data from the communication apparatus;
a determining step of, when the acquisition request is received in the receiving step, determining whether or not there is update data corresponding to the communication apparatus based on the identification information; and
a delivery requesting step of, when there is update data corresponding to the communication apparatus, requesting a delivery server which stores the update data to deliver the update data,
wherein when the response message is received by the receiving step, the delivery requesting step requests the delivery server to acquire processing load of the delivery server to be applied upon delivery of the update data,
further comprising: a comparing step comparing the processing load of the delivery server, which is applied upon delivery of the update data, with a pre-set value, wherein
when the comparing step determines that the processing load of the delivery server to be applied upon delivery of the update data is less than the pre-set value, the delivery requesting step requests the delivery server to deliver the update data to the communication apparatus from which the response message is received.

* * * * *